Patented Nov. 3, 1942

2,300,777

UNITED STATES PATENT OFFICE 2,300,777

METHOD OF GRADING FRUIT

Burton C. Coons, San Jose, Calif., assignor to Food Machinery Corporation, San Jose, Calif., a corporation of Delaware No Drawing. Application October 17, 1940, Serial No. 361,603

9 Claims. (Cl. 146—17)

The present invention appertains to a method of grading fruit such as maraschino style cherries or the like and relates primarily to a method of separating pitted from unpitted fruit, and of quality grading the pitted fruit.

In the preparation of whole maraschino cherries it is customary to treat the unpitted fruit by soaking it in a brine solution, and then remove the pits.

In commercial practice cherries are commonly pitted by one of two well-known methods. One of these consists in making an incision at the stem end of the fruit and extracting the pit therethrough by means of tongs or pincers. The other, and perhaps more common method, is to force the pit through the body of the cherry by means of a punch. In either case an opening is formed in the fruit by the extraction of the pit, and this opening communicates with an air pocket in the center of the fruit previously occupied by the pit.

It has been discovered, not only that pitted and unpitted cherries have a different specific gravity and may be separated in a liquid of proper density, but also that by closing the opening through which the pit has been extracted, a substantially sealed air pocket is formed within the center of the fruit previously occupied by the pit, and an additional separation of the pitted fruit into grades of different quality may be obtained.

It is therefore one of the objects of the present invention to provide a method of separating pitted and unpitted cherries and of quality-grading the pitted fruit.

Another object is to provide a method of separating pitted cherries containing a substantially closed air pocket from cherries which do not have such closed air pocket.

A further object is to provide a method of separating pitted cherries without a closed air pocket from unpitted cherries.

Another object is to provide a method of separating unpitted cherries from pitted cherries irrespective of the quality of the pitted cherries.

Another object is to provide a method of quality-grading of cherries and subsequently separating the pitted and unpitted cherries.

Other objects, uses, adaptations and advantages of the present invention will become apparent from the following description, wherein particular reference is being made to the separation of pitted and unpitted maraschino cherries or similar fruits.

In commercial practice the pitting of cherries is usually performed mechanically by pitting machines in which the cherries are held in a centered position with respect to a pitting tool which enters the fruit and removes the pit. In one type of machine it is customary to extract the pit through the stem end of the fruit by tongs or the like and to form, preparatory to the extraction of the pit, radial incisions at the stem end of the fruit which extend through the meat toward the pit to facilitate the removal of the pit without tearing away parts of the flesh, by permitting an outward bending of the meat and skin portions at the stem end of the fruit during the extracting operation.

In another type of pitting machine, the pitting tool is in the form of a punch which enters through one end of the fruit, forcing the pit through the flesh of the fruit without previous incision thereof. In this instance the pit itself cuts and bends the meat and skin portion of the cherry as it emerges from the fruit.

While these cherry pitting machines are ordinarily very satisfactory in their operation, it occasionally happens, from any one of various causes, that the pitting tool fouls or misses a pit, which therefore remains within the fruit. These unpitted cherries are very difficult to detect and are obviously undesired in the finished product. Occasionally also fragments of flesh or skin may be torn from the fruit during the pitting thereof, and such cherries are therefore not quite satisfactory as a first grade product. A grading of the fruit to separate the pitted and unpitted cherries, and to separate the pitted cherries of different qualities, is therefore highly desirable.

In carrying out the process of the present invention, the meat and skin portions of the pitted cherry which have been bent and dislocated in the region of the wound formed by the extraction of the pit are first pressed back into place to close the wound, so that a sealed, or substantially sealed, air pocket is formed in the center of the fruit previously occupied by the pit. The closing of the wound of the fruit may be done manually by pressing the meat portions, with the finger, back into the center of the fruit, or mechanically as by a presser foot or any other type of tucking mechanism pressing upon the wound from which the pit emerged. If, however, portions of the meat or skin of the cherry have been torn away in the region of the wound during the extraction of the pit, the cherries can not be sufficiently closed to form a substantially sealed air pocket within the center of the fruit but will remain open.

Thereupon, the mixed mass of pitted and unpitted fruit is placed in a suitable grading solution to separate the pitted and closed cherries from the unpitted cherries and the pitted but open fruit. The specific gravity of this solution is such that both the unpitted cherries as well as the pitted but open cherries (i. e. those which do not contain a sealed air pocket) will sink therein, while the pitted and closed cherries (i. e. those which contain a substantially sealed air pocket) will float.

For separating maraschino cherries the customary pickling solution in which the cherries are stored to preserve the same may be satisfactorily used as grading solution. However, any other suitable brine or sugar solution may be employed provided that the specific gravity of such solution is lower than the specific gravity of the pitted cherries.

The flotation of the cherries in the solution above referred to takes place by reason of the buoyant action of the entrapped air within the fruit. Therefore the cherries which contain a closed or substantially closed air pocket will float while those cherries which do not contain a closed or substantially closed air pocket, as well as fragments of cherries and unpitted cherries will immediately sink therein.

It will be obvious that the pitted but open cherries cannot float in this solution as the air pocket has not been properly closed and the air will therefore escape from the pocket previously occupied by the pit upon submersion of the fruit.

From the above it will therefore be seen that a perfect separation of the pitted and closed cherries from the remaining cherries is accomplished, and the floating or first-grade cherries may be collected from the surface of the grading solution in any desired manner.

The pitted but open cherries and the unpitted cherries, all of which sink in the grading solution, are thereupon removed from the same and may be placed in another more concentrated grading solution having a specific gravity slightly above the specific gravity of the pitted but open cherries, but not of sufficient density to float or suspend the unpitted cherries. When the pitted but open cherries and the unpitted cherries are placed in this solution, the pitted cherries will float and the unpitted cherries will sink.

Any suitable brine or sugar solution may be employed for carrying out the separation last referred to; however, the density of this solution must be slightly above the specific gravity of the pitted cherries and below the specific gravity of the unpitted cherries so that a separation between the pitted but open cherries, fragments of cherries and the unpitted cherries is obtained.

During this step in the method of the present invention, the unpitted cherries which sink, and the pitted but open cherries or fragments thereof which float, may be separately collected in any desired manner. The pitted but open cherries may be packed or further treated as second grade fruit, which still has a considerable marketable value. The unpitted cherries may be returned to the pitting machine for removal of the pits thereof and regraded after such pitting operation in the same manner as described hereinabove.

While in the foregoing reference has been made to the grading of maraschino cherries, it has to be understood that the method of the present invention is equally well adaptable for grading fresh cherries. If fresh whole cherries are to be separated in accordance with the method of the instant invention, any suitable brine solution, sugar solution, or the like which does not affect the taste or condition of the fruit may be employed. The specific gravity of these solutions must, of course, be of the same density as set forth herein for carrying out the first and second steps of the separation in a manner as hereinabove stated.

The strength of the solutions employed in accordance with the teachings of the present invention may vary depending upon the sugar content of the cherries or any other factors which may vary the specific gravity of the cherries. However, the specific gravity of the cherries and the density of the solutions employed should always be maintained in the same relation as set forth herein.

While hereinabove reference has been made to a two-step separation method, it will be apparent that if only a separation between pitted and unpitted cherries is desired, regardless of the quality of the pitted cherries, or if only a separation of the pitted and closed cherries from the remaining fruit is desired, the first or second step, respectively, of the present method may be omitted.

Depending upon the amount of entrapped air within the pitted fruit, even water may serve as a grading solution for carrying out the first step of grading of the method explained herein, and in this respect the present invention is not limited to solutions heavier than water.

It has been found that during the first step of separation of the method of the present invention, the air entrapped and enclosed within the pitted cherries has a tendency to escape from the pocket within the fruit in case the same is not completely sealed after the pitting of the fruit. This tendency, however, is sufficiently retarded when a solution heavier than water is used during the first step of separation of the instant invention, so that the cherries will float a considerable length of time, within which the same may be conveniently separated and grouped.

If water is used the air will escape more rapidly from the not completely closed pockets in the center of the cherries when the same are dropped in the grading solution. This appears to be due to the fact that the cherries will momentarily sink deeper in water than in a solution of greater density when they are dropped therein, and the buoyancy force acting upon the enclosed air tending to remove the same will be, during such time, comparatively larger in water than in a heavier liquid. Therefore, if water is used as a grading solution for carrying out the first step of separation of the fruit the floating cherries must be collected more rapidly from the grading solution, because some of the cherries with a substantially but not completely sealed air pocket will only float for a comparatively short time.

It will be understood that while the process of the present invention has been described as employed for grading cherries, it is contemplated that it may be used for grading other drupaceous fruits and the term "cherries" as used in the claims is intended to be inclusive of such other fruits.

While the present invention has been described in considerable detail, it is not desired to limit the same to the specific mode and practice of the method as disclosed herein, nor the specific type of grading solutions set forth in the above, as many changes or modifications may be made within the purview of the appended claims.

Having thus described the present invention, what is claimed as new and desired to protect by U. S. Letters Patent is:

1. The method of grading pitted cherries consisting in closing the wound of the cherries caused by the extraction of the pit to form a substantially sealed air pocket within the fruit, subjecting the cherries to a grading operation in a solution of suitable density wherein the cherries with a substantially sealed air pocket will float and without such substantially sealed air pocket will sink, whereby they are separated into different groups.

2. The method of grading a mixed mass of pitted and unpitted cherries consisting in closing the wound of the pitted cherries caused by the extraction of the pit to form a substantially sealed air pocket within the fruit, subjecting the mixed mass of pitted and unpitted cherries to a grading operation in a solution of suitable density wherein the cherries with a substantially sealed air pocket will float and the cherries without such substantially sealed air pocket will sink, whereby they are separated into different groups.

3. The method of grading a mixed mass of pitted and unpitted cherries consisting in closing the wound of the pitted cherries caused by the extraction of the pit to form a substantially sealed air pocket within the fruit, subjecting the mixed mass of pitted and unpitted cherries to a grading operation in a solution of suitable density wherein the cherries with a substantially sealed air pocket will float and without such substantially sealed air pocket will sink, and subsequently subjecting the sunken cherries to a grading action in another solution wherein the pitted cherries will float and the unpitted cherries will sink, whereby they are separated into different groups.

4. The method of grading a mixed mass of pitted cherries having an artificially created substantially closed air pocket, pitted cherries without such substantially closed air pocket, fragments of cherries and unpitted cherries consisting in subjecting said mass to a grading action in a grading liquid wherein the unpitted cherries, fragments of cherries, and pitted cherries without a substantially closed air pocket will sink and the pitted cherries with a substantially closed air pocket will float whereby they are separated into different groups.

5. The method of grading a mixed mass of fruit comprising pitted cherries having a substantially closed artificially created air pocket, pitted cherries without such substantially closed air pocket, fragments of cherries and unpitted cherries consisting in subjecting said mass to a grading action in a grading liquid wherein the unpitted cherries, fragments of cherries, and pitted cherries without a substantially closed air pocket will sink, and the pitted cherries with a substantially closed air pocket will float, and subsequently subjecting the sinkers to a grading action in a grading solution wherein the unpitted cherries will sink and the fragments of cherries and the pitted cherries without a substantially closed air pocket will float whereby the pitted cherries are separated from the unpitted fruit and divided into groups of different quality.

6. The method of grading a mixed mass of fruit comprising pitted cherries having an artificially created substantially closed air pocket, pitted cherries without such substantially closed air pocket, and unpitted cherries consisting in subjecting said mass to a grading action in a grading liquid wherein the unpitted cherries and the pitted cherries without a substantially closed air pocket will sink and the pitted cherries with a substantially closed air pocket will float, collecting the sinkers and floaters in separate groups, subjecting the sinkers to a grading action in a grading solution wherein the unpitted cherries will sink and the pitted cherries without a substantially closed air pocket will float and separately collecting the sinkers and floaters of the latter group.

7. The method of grading cherries consisting in subjecting a mixed mass of cherries having an artificially created substantially sealed air pocket and cherries without such substantially sealed air pocket to a grading operation in a suitable liquid wherein the cherries with a substantially sealed air pocket will float and the cherries without such substantially sealed air pocket will sink whereby they are separated into different groups.

8. The method of grading cherries consisting in subjecting a mixed mass of cherries having an artificially created substantially sealed air pocket and cherries without such substantially sealed air pocket to a grading action in a solution of a specific gravity lighter than the specific gravity of the fruit wherein the cherries without a substantially sealed air pocket will sink and the cherries with such substantially sealed air pocket will float, and collecting the sinkers and floaters from said solution in separate groups.

9. The method of grading cherries consisting in subjecting a mixed mass of pitted cherries having an artificially created substantially closed air pocket, and pitted and unpitted cherries without a substantially closed air pocket to a grading action in a solution of a specific gravity lighter than the specific gravity of the fruit wherein the pitted and unpitted cherries without such substantially closed air pocket will sink and the pitted cherries with a substantially closed air pocket will float, and subsequently subjecting the sinkers to a grading action in another solution wherein the unpitted cherries will sink and the pitted cherries will float whereby the cherries are separated into various groups.

BURTON C. COONS.

CERTIFICATE OF CORRECTION.

Patent No. 2,300,777.　　　　　　　　　　　　　　November 3, 1942.

BURTON C. COONS.

It is hereby certified that error appears in the printed specification of the above numbered patent requiring correction as follows: Page 3, second column, line 6, claim 5, strike out the syllable and words "rated from the unpitted fruit and divided into"; and that the said Letters Patent should be read with this correction therein that the same may conform to the record of the case in the Patent Office.

Signed and sealed this 30th day of March, A. D. 1943.

Henry Van Arsdale,
Acting Commissioner of Patents.

(Seal)